US006915181B2

(12) United States Patent
Shinozaki et al.

(10) Patent No.: US 6,915,181 B2
(45) Date of Patent: Jul. 5, 2005

(54) NUMERICAL CONTROL DEVICE AND METHOD

(75) Inventors: Satoru Shinozaki, Shimodate (JP); Hideaki Maeda, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 218 days.

(21) Appl. No.: 10/118,979

(22) Filed: Apr. 10, 2002

(65) Prior Publication Data

US 2002/0152003 A1 Oct. 17, 2002

(30) Foreign Application Priority Data

Apr. 12, 2001 (JP) .................................. 2001-114194

(51) Int. Cl.[7] .............................................. G06F 19/00
(52) U.S. Cl. ...................................... 700/169; 700/180
(58) Field of Search ................................ 700/160, 159, 700/169, 172, 176, 179, 180, 181, 83, 86, 182

(56) References Cited

U.S. PATENT DOCUMENTS 6,112,133 A * 8/2000 Fishman ..................... 700/182
6,397,123 B1 * 5/2002 Miyajima et al. ........... 700/160

FOREIGN PATENT DOCUMENTS

| JP | 6-59716 | 3/1994 |
| JP | 11-345009 | 12/1999 |
| JP | 2001-79734 | 3/2001 |

* cited by examiner

*Primary Examiner*—Leo Picard
*Assistant Examiner*—Steven R. Garland
(74) *Attorney, Agent, or Firm*—Staas & Halsey LLP

(57) ABSTRACT

A numerical control device for compound machine tool has an interactive facility software to enable a working program and various sorts of data to be input in an interactive form. With the interactive facility software, various sorts of data such as a tool compensation amount required for a working operation and a work coordinate system can be read at any time by accessing to a memory storing a lathe turning control software and a milling control software.

9 Claims, 9 Drawing Sheets

WORKING PROGRAM INPUT SCREEN

WORKING DATA INPUT SCREEN
(TOOL OFFSET DATA)

WORKING DATA INPUT SCREEN
(WORK COORDINATE SYSTEM DATA)

FIG. 8  PRIOR ART

```
PROGRAM                                  O2000 N00130

O2000 :
  N100 G02 X0 Y0 Z70. ;
  N110 G91 G00 Y-70. .
  N120 Z-70. ;
  N130 G12 G39 I-17.5 ;
  N140 G41 G03 X 17.5 Y17.5 R17.5 ;
  N150 G01 X-25. ;
  N160 G02 X27.5 Y27.5 R27.5
  N170 G01 X20. ;
  N180 G02 X45. Y45. R45. ;
                                          S  0  T0000
MEM STRT        --+            16:05:50
[ PROGRAM ] [  CHECK  ] [CURRENT BLOCK] [ NEXT BLOCK ] [ (OPERATION) ]
```

WORKING PROGRAM INPUT SCREEN

FIG. 9  PRIOR ART

```
TOOL COMPENSATION                        O0001 N00001
   NUMBER    SHAPE (H)   WEAR (H)   SHAPE (D)   WEAR (D)
    001      10.000       0.000      0.000       0.000
    002      -1.000       0.000      0.000       0.000
    003       0.000       0.000      0.000       0.000
    004      20.000       0.000      0.000       0.000
    005       0.000       0.000      0.000       0.000
    006       0.000       0.000      0.000       0.000
    007       0.000       0.000      0.000       0.000
    008       0.000       0.000      0.000       0.000
CURRENT POSITION (RELATIVE COORDINATES)
        X       0.000              Y        0.000
        Z       0.000

>_
 MDI  ****  ***  ***             16:52:13
[ OFFSET ] [ SETTING ] [        ] [        ] [ (OPERATION) ]
```

LATHE TURNING DATA INPUT SCREEN
(TOOL OFFSET DATA)

FIG. 10  PRIOR ART

| TOOL COMPENSATION / SHAPE | | | 00001 N00000 | |
|---|---|---|---|---|
| NUMBER | X-AXIS | Z-AXIS | RADIUS | TIP |
| G 001 | 0.000 | 1.000 | 0.000 | 0 |
| G 002 | 1.486 | -49.561 | 0.000 | 0 |
| G 003 | 1.486 | -49.561 | 0.000 | 0 |
| G 004 | 1.486 | 0.000 | 0.000 | 0 |
| G 005 | 1.486 | 49.561 | 0.000 | 0 |
| G 006 | 1.486 | -49.561 | 0.000 | 0 |
| G 007 | 1.486 | -49.561 | 0.000 | 0 |
| G 008 | 1.486 | -49.561 | 0.000 | 0 |

CURRENT POSITION (RELATIVE COORDINATES)
U    0.000         W    0.000

\>_
MDI ** * ***          16:17:33
[ WEAR ] [ SHAPE ] [ ] [ ] [ (OPERATION) ]

MILLING DATA INPUT SCREEN
(TOOL OFFSET DATA)

FIG. 12  PRIOR ART

```
SETTING OF WORK COORDINATE SYSTEM            O0000 N00000
 (G54)
       NUMBER      VALUE      NUMBER      VALUE

00    X    0.000       02    X    152.580
       (EXT)  Y    0.000      (G55)  Y     56.284
              Z    0.000              Z     0.000

01    X   100.000      03    X    300.000
       (G54)  Y    50.000     (G56)  Y    200.000
              Z    50.000             Z     0.000

>_                             S   0 T0000
       MDI ****  ***  ***                   12:12:48
        [ OFFSET ][ SETTING ][ COORDINATE ][        ][OPERATION]
                              SYSTEM
```

MILLING DATA INPUT SCREEN
(WORK COORDINATE SYSTEM DATA)

FIG. 13  PRIOR ART

```
SETTING OF WORK COORDINATE SYSTEM            O0000 N00000

NUMBER      VALUE      NUMBER      VALUE

00    X    0.000       02    X    152.580
       (EXT)  Z    0.000      (G55)  Z     56.284

01    X   100.000      03    X    300.000
       (G54)  Z    50.000     (G56)  Z    200.000

>_                             S   0 T0000
       MDI ****  ***  ***                   12:12:48
        [ OFFSET ][ SETTING ][ COORDINATE ][        ][OPERATION]
                              SYSTEM
```

LATHE TURNING DATA INPUT SCREEN
(WORK COORDINATE SYSTEM DATA)

NUMERICAL CONTROL DEVICE AND METHOD

CROSS-REFERENCE TO RELATED APPLICATIONS

This application claims the benefit of Japanese Patent Application No. 2001-114194, filed on Apr. 21, 2001, in the Japanese Patent Office, the disclosure of which is incorporated herein by reference.

BACKGROUND OF THE INVENTION

1. Field of the Invention

The present invention relates to a numerical control device for a compound machine tool that enables lathe turning and milling to be performed on the same machine.

2. Description of the Related Art

Conventional numerical control devices for compound machine tools have no interactive facility for supporting an arrangement operation in producing a working program or measuring a tool compensation amount. A compound machine tool has a lathe turning mode and a milling mode to perform both the lathe turning and the milling. Each mode has a different program format, and an NC program corresponding to each working mode must be created. Also, an NC program for switching between these working modes must be created.

Further, to effect work in each working mode, it is required for each working program to set up the tool compensation amounts for lathe turning and milling, separately, which operation is very complex FIG. 6 is a schematic diagram of a conventional numerical control device for a compound machine tool.

The numerical control device for a compound machine tool is composed of a CPU, a memory, a display unit, an input device such as a keyboard, and an input/output interface. A software storage area is divided into a lathe turning software storage area 1 and a milling software storage area 2, in which lathe turning control software 4 is stored in the lathe turning software storage area 1, and milling control software 5 is stored in the milling software storage area 2.

In the hardware configuration, there are both cases where separate CPUs are provided for the lathe turning and the milling and where a single CPU is shared. In the latter case, the CPU is shared between two software programs by time division.

A compound machine tool working program 3 is stored in either the lathe turning software storage area 1 or the milling software storage area 2. In an example of FIG. 6, it is stored in the lathe turning software storage area 1. This compound machine tool working program 3 consists of a lathe turning program and a milling program in a single working program, which are discriminated in accordance with an M code Myy for instructing a lathe turning and an M code Mxx for instructing a milling, as shown in FIG. 6.

This compound machine tool working program 3 is executed, and if the M code Myy for instructing a lathe turning is read, the lathe turning control software 4 is initiated to read the lathe turning program that is programmed after the M code Myy, making the analysis and interpolation, and performing the lathe turning. Also, if the M code Mxx for instructing the milling is read, the milling control software 5 is initiated to read the milling program that is programmed after the M code Mxx, making the analysis and interpolation, and performing the milling.

Reference numeral 6 denotes a switch facility for selecting an axis movement command (servo command) to be outputted to a servo amplifier 7 if the M code Myy or M code Mxx is read from the compound machine tool working program 3. If the lathe turning M code Myy is read, the switch 6 outputs an axis movement command processed and outputted by the lathe turning control software 4 to the servo amplifier 7 for each axis. Also, if the milling M code Mxx is read, the switch is changed from a state of FIG. 6 to an inverse state, and outputs an axis movement command processed and outputted by the milling control software 5 to the servo amplifier 7 for each axis.

The servo amplifier 7 for each axis drives a servo motor 8 based on the axis movement command, and moves each shaft connected thereto to perform the lathe turning or milling.

Reference numeral 9 denotes a switch or other switching means on an operator control panel 11 to selectively start either the lathe turning control software 4 or the milling control software 5. A display unit 10 displays a working program and various sorts of data required for the working operation. The operator control panel 11 having a keyboard and the like is employed to input a working program and various sorts of data required for the working operation.

FIG. 7 is a flowchart of an input setting operation for inputting a working program or various sorts of set values such as tool compensation amount in the numerical control device for a compound machine tool.

First of all, the display unit 10 is switched to a working program inputting screen, as shown in FIG. 8. For the input of a lathe turning program, a lathe turning M code Myy is inputted, and a lathe turning program is inputted, employing the keyboard on the operator control panel 11 (operations 201 to 203). Also, for the input of a milling program, a milling M code Mxx is inputted, and a milling program is inputted (operations 201, 204, 205).

If the input of a working program is ended (operation 206), the display unit 10 is switched to a lathe turning data screen, as shown in FIG. 9. In this case, the switch 9 is turned to the side of the lathe turning control software 4, which is thereby initiated to display a lathe turning data input screen on the display unit 10. Based on the lathe turning data input screen that is displayed, various sorts of data such as a tool compensation amount are inputted from the operator control panel 11 and set up (operations 207, 208).

Then, a milling data screen is selected to input and set up milling data. If the milling data screen is selected, the switch 9 is turned to the side of the milling control software 5, which is thereby initiated to display the milling data input screen on the display unit 10, as shown in FIG. 10. Based on the milling data input screen, various sorts of data required for the milling are inputted and set up (operations 209, 210).

In this manner, the composite working program 3 composed of a lathe turning program and a milling program is inputted, and the lathe turning data and the milling data are inputted and set up. Then, a working command is inputted (operation 211). If the lathe turning M code Myy is read based on the input composite working program 3, the lathe turning control software 4 is initiated to read the lathe turning program following the code Myy, making the analysis and interpolation to output an axis movement command to the servo amplifier 7 for each axis, and drive the servo motor 8 for each axis to enable the machine to perform the lathe turning. Also, if the milling M code Mxx is read, the milling control software 5 is initiated to read the milling program, making the analysis and interpolation to output an axis movement command to the servo amplifier 7 for each axis, and drive the servo motor 8 for each axis to enable the machine to perform the milling.

The conventional numerical control device for compound machine tool is operated in the above way. In this conventional numerical control device for a compound machine tool, when a working program is inputted, the working program must be written step-by-step using an NC program language. In order to input various sorts of data such as set values including a tool compensation amount required for the working, in the case of a lathe turning, the lathe turning control software 4 is initiated to display the lathe turning data input screen on the display unit, while, in the case of the milling, the milling control software 5 is initiated to display the milling data input screen on the display unit.

In the above example, the numerical control device for a compound machine tool is employed to make the lathe turning and the milling. However, a numerical control device for a lathe may be employed to make the lathe turning and a simple milling, instead of a numerical control device for compound machine tool.

FIG. 11 is a schematic diagram of a simple type numerical control device for a compound machine tool using a numerical control device for a lathe. The same or like parts are designated by the same reference numerals throughout FIGS. 6 and 11. In a software storage area 21, a working control software 23 and an interactive facility controlling software 24 are stored, and a compound machine tool working program 22 may be stored. As this simple type numerical control device is composed of a numerical control device for a lathe to which a simple milling function is added, the format of the working program for a milling is that of the working program for a lathe turning. Namely, a preparation function (G code) for use in the working program is different between the lathe system and the milling system. Usually, the working program for the lathe turning is produced employing the G code for the lathe system, while the working program for the milling is produced employing the G code for the milling system. However, in this simple type numerical control device for a compound machine tool, which comprises a numerical control device for a lathe, the working program for milling must be created using G codes for lathe system and the like.

Also, the working control software 23, composed of a lathe turning control software as a basis to which a simple milling control software is added, reads a lathe turning program and a milling program in the working program 22 to make analysis and interpolation thereof, and outputs an axis movement command (servo command) to the servo amplifier 7 for each axis. The servo amplifier 7 for each axis drives the servo motor 8 for each axis to move the shaft connected thereto, based on the axis movement command, thereby performing the working operation of the machine.

The interactive facility controlling software 24 allows the working program to be input in a menu format to support an input operation. A menu is displayed on the display unit 10 so that various sorts of data can be inputted on the operator control panel 11 and the like in accordance with the displayed menu. Based on the inputted data, the interactive facility controlling software 23 produces a compound machine tool working program 22.

In order to input and set up various sorts of data required for working, a set-up screen for lathe turning and milling is displayed on the display unit 11. FIG. 12 is an example of a milling data input screen for setting a work coordinate system data. FIG. 13 is an example of a lathe turning data input screen. In this manner, in this simple type numerical control device for a compound machine tool, it is required to input the data by switching the display unit between the lathe turning screen and the milling screen, when inputting various sorts of setting data.

In FIG. 11, reference numeral 25 denotes a flow of data for producing a working program to be stored in the memory area 21. Reference numeral 26 denotes a flow of data when displaying the data such as the tool compensation amount required for the working operation that is stored in the memory on the screen and setting up the input data.

In this simple type numerical control device for a compound machine tool, there are problems in that all the functions necessary for milling are not included, and a working program for milling in the milling format can not be used directly.

As described above, in a conventional numerical control device for a compound machine tool that enables both lathe turning and milling, switching to a lathe turning screen or a milling screen is required when inputting and setting up tool compensation amounts necessary for the operation of either the lathe turning program or the milling program and other data necessary for working operations, resulting in a problem that the operability is not as desired.

OBJECTS AND SUMMARY OF THE INVENTION

It is an object of the invention to provide a numerical control device for a compound machine tool that allows working programs and various sorts of data to be inputted in an interactive manner using an interactive facility controlling software and has good operability.

To attain the above object, an interactive type numerical control device for a compound machine tool that performs lathe turning and milling, according to the present invention, comprises a lathe turning control software and a milling control software that are independent from each other, and an interactive facility controlling software for supporting an input operation for the lathe turning and the milling. The lathe turning data and the milling data, which are different from each other, can be input and displayed on the same screen under the control of the interactive facility controlling software.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent more readily appreciated from the following description of the embodiments taken in conjunction with the accompanying drawings, in which:

FIG. 8 is an example of a working program inputting screen in the conventional numerical control device for a compound machine tool;

FIG. 9 is an example of a lathe turning data input screen in the conventional numerical control device for a compound machine tool;

FIG. 10 is an example of a milling data input screen in the conventional numerical control device for a compound machine tool;

FIG. 12 is an example of a milling data input screen in the conventional simple type numerical control device for a compound machine tool; and FIG. 13 is an example of a lathe turning data input screen in the conventional simple type numerical control device for a compound machine tool.

DETAILED DESCRIPTION OF THE PREFERRED EMBODIMENTS

Figure 1:
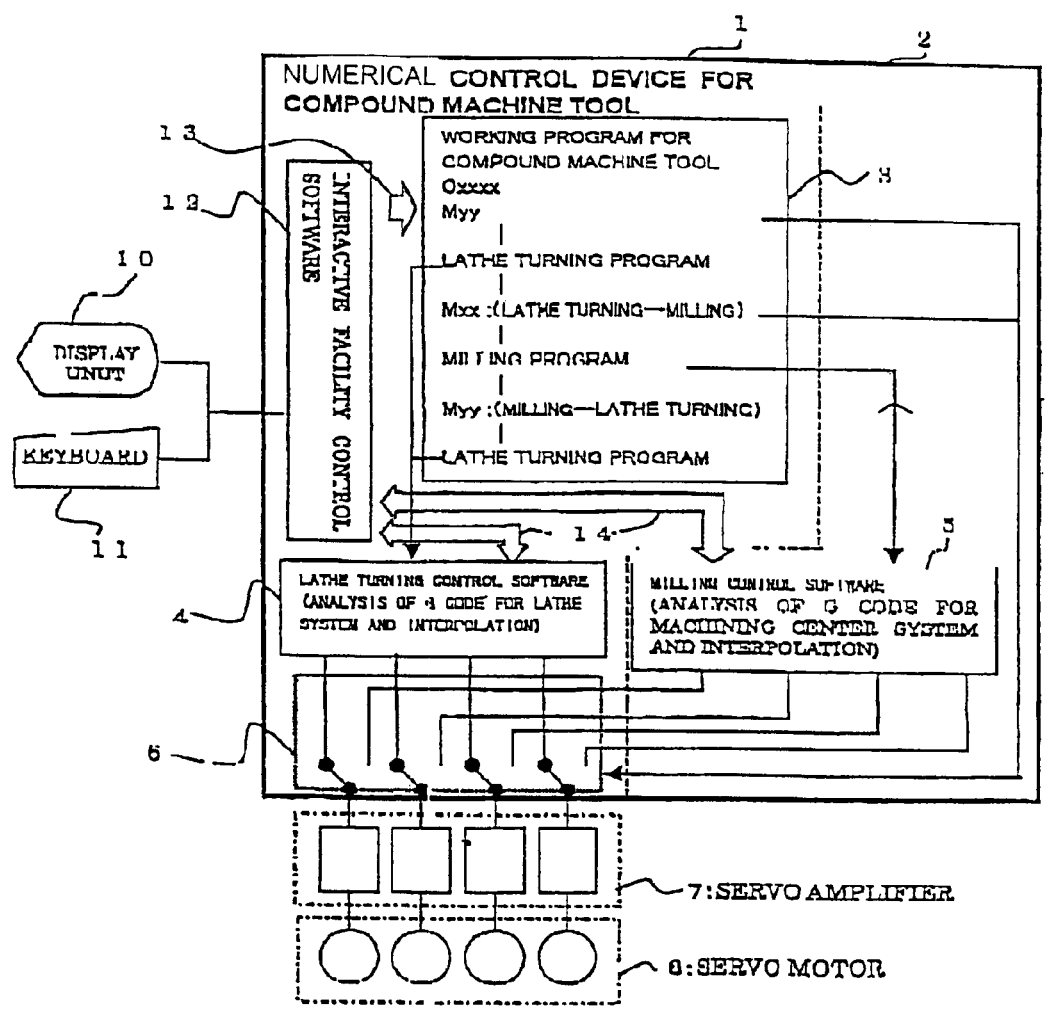
FIG. 1 is a schematic diagram of a numerical control device for a compound machine tool according to one embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
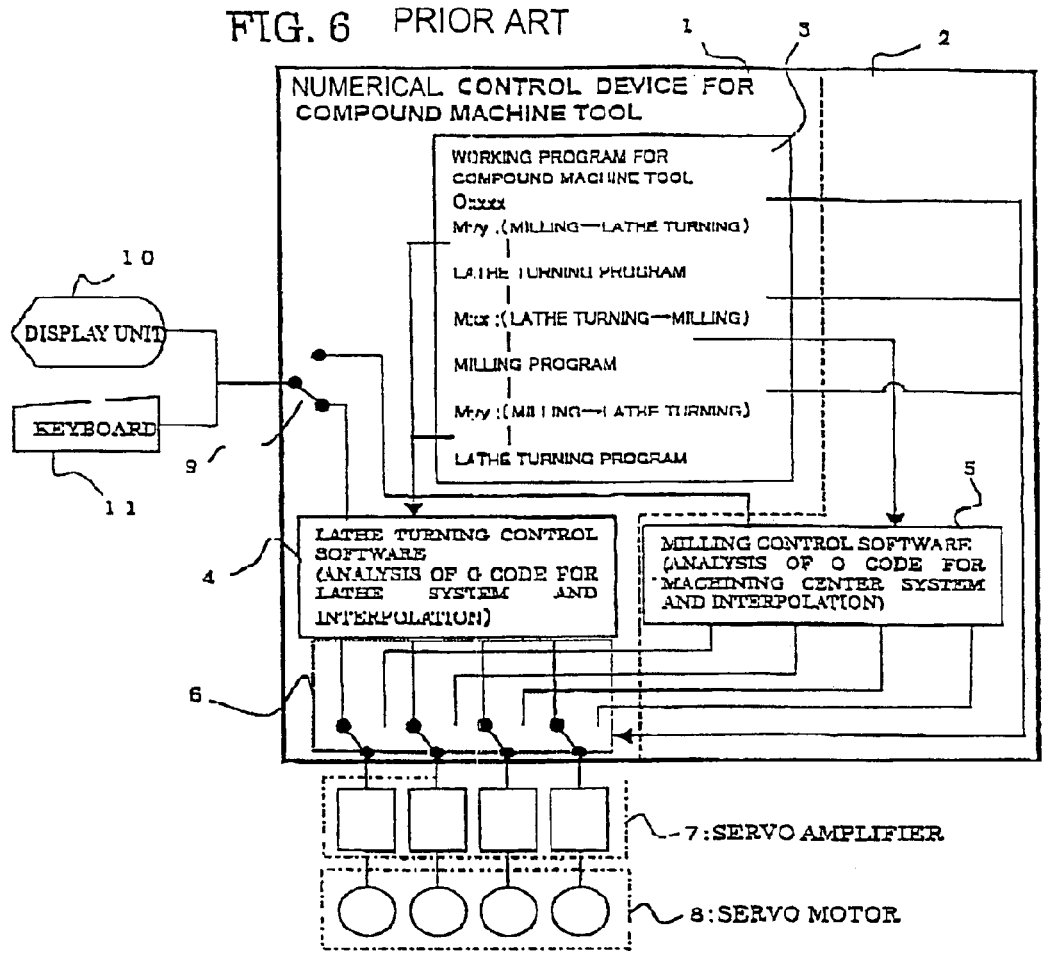
FIG. 6 is a schematic diagram of a conventional numerical control device for a compound machine tool.
Figure 7:
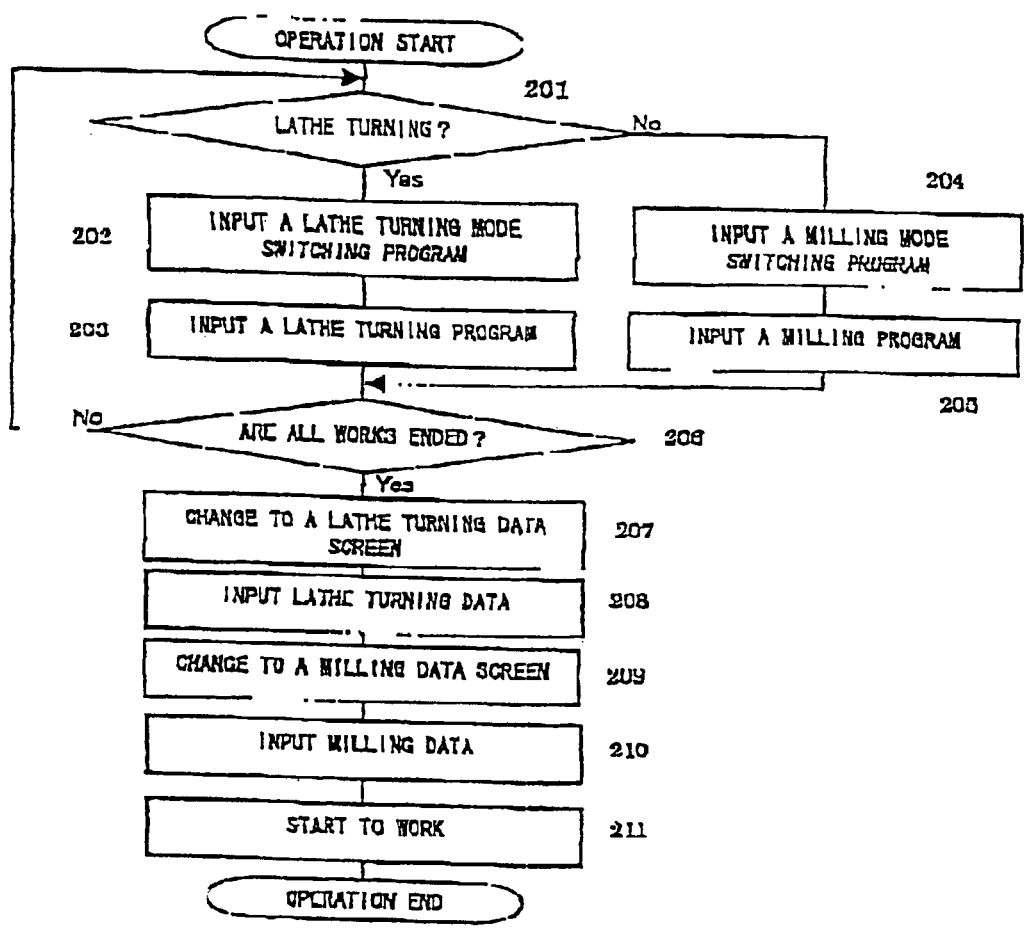
FIG. 7 is a flowchart for inputting a working program and inputting and setting up various sorts of set values and data required for working operation in the conventional numerical control device for a compound machine tool.

FIG. 1 is a schematic diagram of a numerical control device for a compound machine tool according to one embodiment of the present invention. This numerical control device for a compound machine tool includes a CPU, a memory, a display unit, an operator control panel having a keyboard, and an input/output interface similar to the conventional numerical control device for a compound machine tool as shown in FIG. 6. However, the numerical control device for compound machine tool has an interactive facility controlling software 12, unlike the conventional numerical control device for a compound machine tool. Consequently, a change-over switch 9 on the operator control panel 11 of the conventional numerical control device for compound machine tool is unnecessary according to an aspect of the present invention and may be omitted. Other parts are the similar to those of the conventional apparatus as shown in FIG. 6. The similar parts are designated by the same reference numerals, and explanation of those parts is omitted here.

According to an aspect of the present invention, in a similar manner as the conventional numerical control device for a compound machine tool as shown in FIG. 6, a lathe turning control software 4 and a milling control software 5 are incorporated, and two CPUs may be provided corresponding to those two software programs 5 and 6, or a single CPU may be shared. Only one CPU is provided in this example embodiment.

In an example as shown in FIG. 1, the interactive facility controlling software 12 is stored in a lathe turning software storage area 1 together with the lathe turning control software 4, but alternatively may be stored in the milling software storage area 2.

This interactive facility controlling software 12 allows the working program and data of various sorts of set values and the like to be input in a menu format to support the input operation. A menu is displayed on the display unit 10 so that various sorts of data may be inputted on the operator control panel 11 in accordance with the displayed menu, employing the keyboard on the operator control panel 11. Based on the input data, the interactive facility controlling software 12 produces a working program 3 for the compound machine tool. In FIG. 1, reference numeral 13 denotes a flow of the data when storing the working program produced by the interactive facility controlling software 12 in the software storage area 2, as described above.

In setting up various sorts of data, when the setting screen is d accessed, the lathe turning screen and the milling screen are displayed as a single working data inputting screen on the display unit so that the data can be inputted and set up, as will be described later. In FIG. 1, reference numeral 14 denotes a flow of that data, showing the-flow of the data for displaying tool compensation amount and the coordinate system setting data required for the working operation, stored in the memories for the lathe turning control software 4 and the milling control software 5, on the same screen collectively, and also showing a flow of the input data.

Also, the compound machine tool working program 3 has a similar format as the compound machine tool working program 3 used in the conventional numerical control device for a compound machine tool as shown in FIG. 6. In case of instructing a lathe turning, a lathe turning program is created using G codes for the lathe system following the M code Myy. In case of instructing a milling, a milling program is created following the M code Mxx. In the example as shown in FIG. 1, the compound machine tool working program 3 is stored in the lathe turning software storage area 1 in this embodiment.

This compound machine tool working program 3 is executed, and if the M code Myy instructing a lathe turning is read, the lathe turning control software 4 is initiated to read the lathe turning program that is programmed following the code Myy, making the analysis and interpolation to output an axis movement command via a switch 6 to a servo amplifier 7 for each axis, and drive each servo motor 8 to move the shaft connected thereto, whereby a lathe turning is performed. Also, if the milling M code Mxx is read, the milling control software 5 is initiated to read the milling program following the M code Mxx, to output an axis movement command to the servo amplifier 7 for each axis via the switch 6 that is changed over to the side of the milling control software 5 by reading the code Mxx, and to move the shaft connected thereto, whereby a milling is performed.

Figure 2:
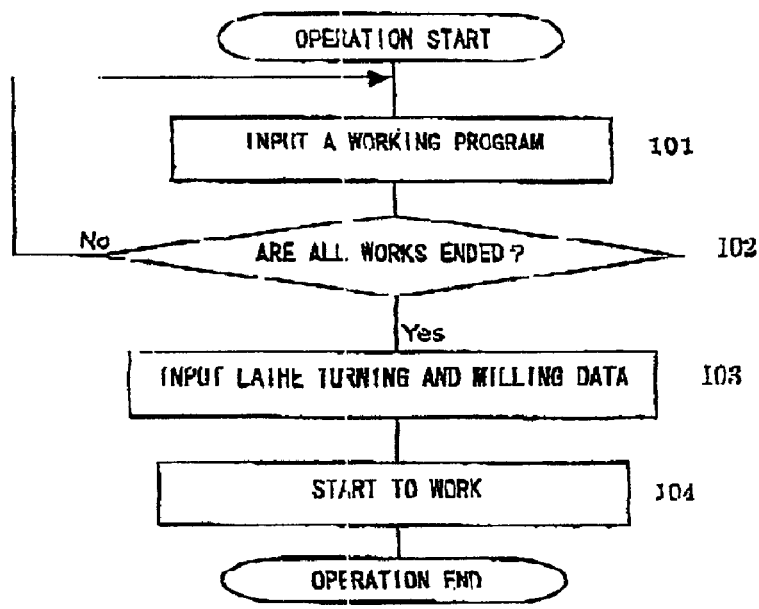
FIG. 2 is a flowchart for inputting a working program and inputting and setting up various sorts of set values and data required for a working operation according to an aspect of the present invention.

FIG. 2 is a flowchart showing inputting of a working program and inputting and setting of tool compensation amounts and various sorts of set values necessary for the working operation such as setting of a coordinate system, in the numerical control device for a compound machine tool.

Figure 3:
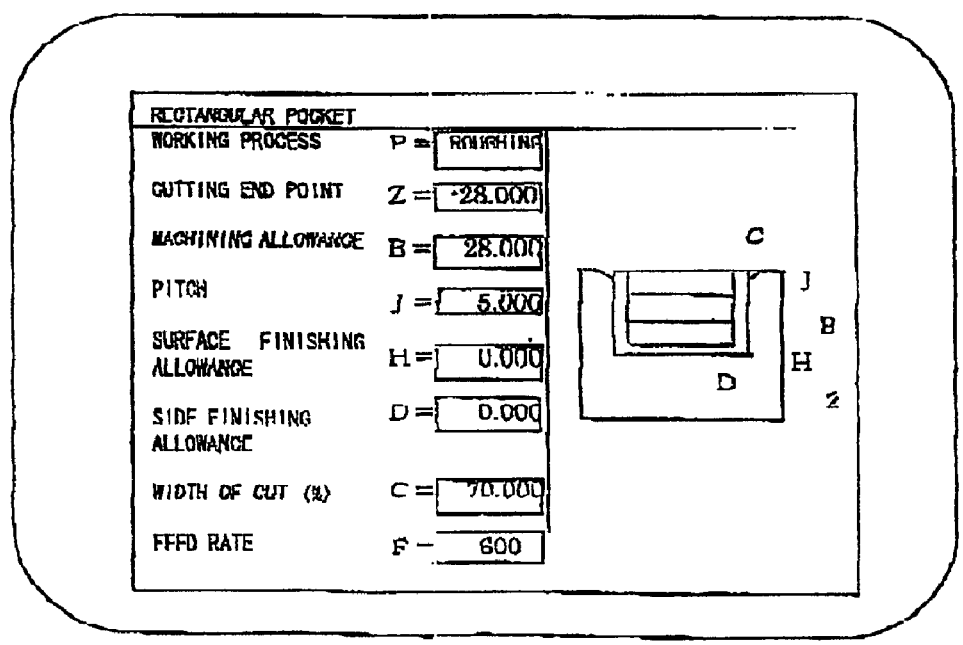
FIG. 3 is an example of a working program inputting screen according to an aspect of the present invention.

When inputting a working program, working data, including material shape, working shape, tool data and cutting conditions, is inputted, in accordance with a menu displayed on the screen of the display unit 10 based on the interactive facility controlling software 12. FIG. 3 is an example of the working program inputting screen in which a cutting condition screen for roughing a rectangular pocket is displayed in a window format. A graphic of a working shape is drawn in a right part of the screen, while the input items for cutting conditions are displayed in a left part of the screen to prompt a user to input data in the input items, thus making an input operation easier.

In this manner, the data required for a work is acquired in an interactive form, and is inputted in accordance with an inquiry, whereby the interactive facility controlling software 12 creates automatically a working program for lathe turning and a working program for milling. At a point when changing from a lathe turning to a milling, or a point when changing inversely, lathe turning M code Myy, or respectively milling M code Mxx, is programmed at the top of the working program in accordance with the kind of work to be performed subsequently, whereby a working program 3 for the compound machine tool as shown in FIG. 1 is produced (operation 101).

In this embodiment, that includes an interactive facility controlling software 12 for a numerical control device for compound machine tool, data such as a working shape is inputted in accordance with a menu to produce a working program. Therefore, since there is no need for inputting each working operation in an NC program language, a working program can be produced without causing errors, even when G codes are different between lathe system and milling system.

After the input of the working program is ended (operation 102), when various data setting screens are requested in accordance with the menu in setting a working data, the data input setting screens for lathe turning and milling are collectively displayed on the same screen (operation 103).

Figure 4:
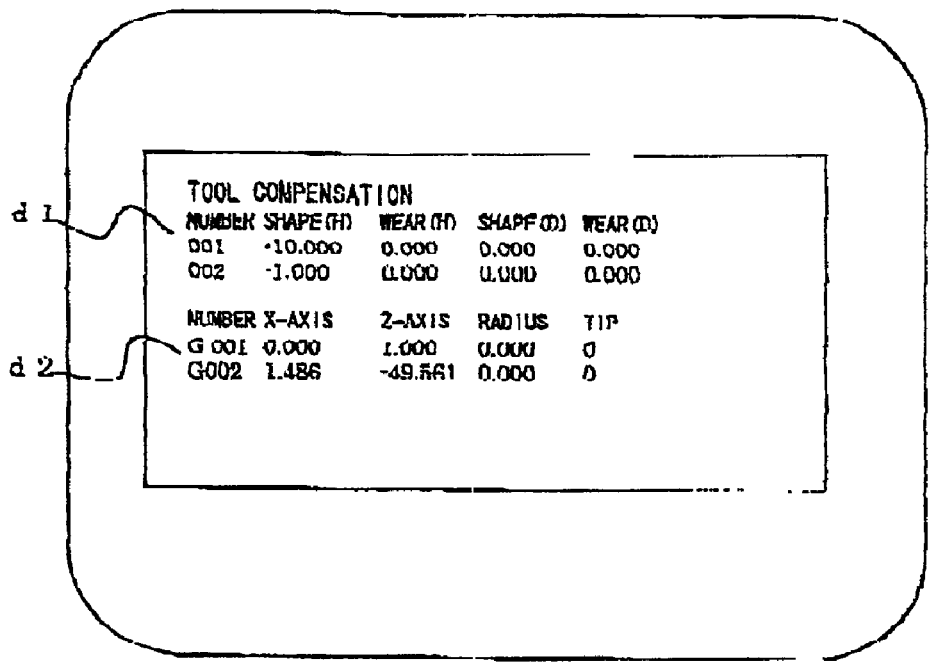
FIG. 4 is an example of a tool offset data input screen according to an aspect of the present invention.

FIG. 4 is an example of a tool offset data input screen, which is displayed in a window form, in which a tool offset data input screen d1 for lathe turning is displayed on the upper side, while a tool offset data input screen d2 for milling is displayed on the lower side.

Figure 5:
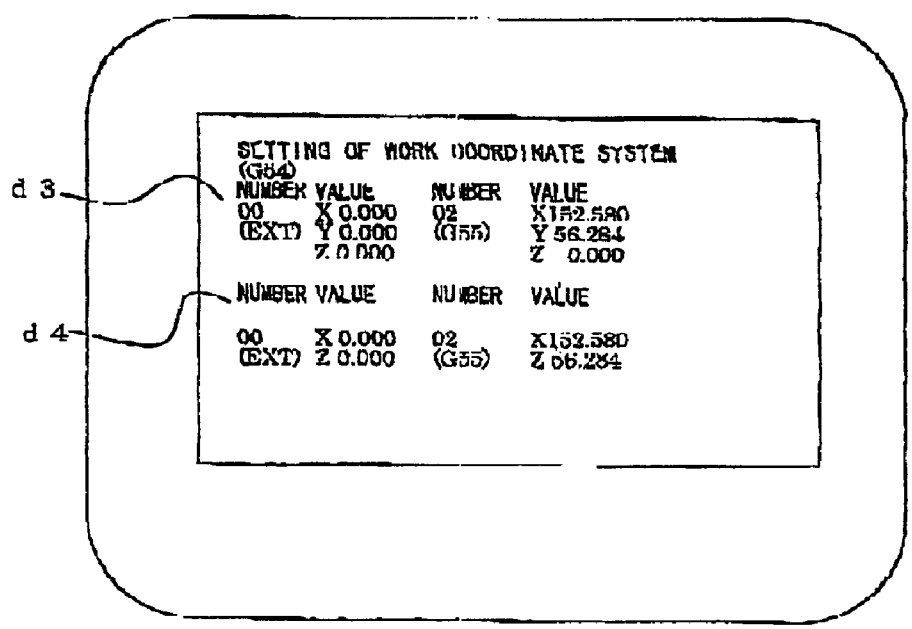
FIG. 5 is an example of a work coordinate system data input screen according to an aspect of the present invention.

FIG. 5 is an example of data input screen for inputting and setting a work coordinate system, in which a lathe turning data input screen d3 is provided in the upper stage while a milling data input screen d4 is provided in the lower stage, so that the work coordinate system setting screens for lathe turning and milling are collectively displayed on the same screen.

In this manner, the use of the interactive facility controlling software 12 allows various sorts of data such as tool compensation amount and work coordinate system for the lathe turning control software 4 and the milling control software 5 required for the working operation and stored in the memory to be read at any time, whereby lathe turning data and milling data are collectively displayed on the same screen, and can be input and set up.

In the above manner, a working is started (operation 104) by inputting the working program 3 for the compound machine tool and then inputting and setting various sorts of data required for the working operation. Then, if lathe turning M code Myy is read from the composite working program 3, the lathe turning control software 4 is initiated to read the lathe turning program following the code Myy, making the analysis and interpolation to output an axis movement command to the servo amplifier 7 for each axis, and drive the servo motor 8 for each axis to enable the machine to perform the lathe turning in a similar manner as the conventional numerical control device for compound machine tool as shown in FIG. 6. If the milling M code Mxx is read, on the other hand, the milling control software 5 is initiated to read the milling program, making the analysis and interpolation to output an axis movement command to the servo amplifier 7 for each axis, and drive the servo motor 8 for each axis to enable the machine to perform the milling.

In the numerical control device for the compound machine tool according to an aspect of the present invention, interactive facility controlling software allows a working program and various sorts of data to be input in the interactive form, resulting in better operability. Particularly, screens for inputting and setting various sorts of data necessary for working operation can be displayed on the same screen collectively for both lathe turning and milling, and data can be inputted and set using the screen. Therefore, it is not necessary to switch from a turning screen to a milling screen or vice versa when inputting and setting and displaying various sorts of data required for the working operation, as compared with conventional cases, which makes the operations easier and simpler. Since the relevant data for a lathe turning and a milling is displayed on the same screen, the interrelation is easily understood and setting errors are prevented.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A numerical control device of interactive type for a compound machine tool that performs lathe turning and milling, comprising:

a lathe turning control software;

a milling control software; and an interactive facility controlling software for supporting an input operation for said lathe turning and said milling;

wherein lathe turning data and milling data are separately inputted and displayed on the same screen under the control of said interactive facility controlling software.

2. The numerical control device according to claim 1, wherein said interactive facility controlling software and said lathe turning control software are stored in the same memory area.

3. The numerical control device according to claim 1, wherein said interactive facility controlling software and said milling control software are stored in the same memory area.

4. The numerical control device according to claim 1, wherein said screen is a screen of a display unit attached to an operator control panel and said interactive facility controlling software creates a working program for a compound machine tool based on the data inputted through the operator control panel.

5. A numerical control device of an interactive type for a compound machine tool, comprising:

a first software for a first type of working of a material;

a second software for a second type of working of the material; and an interactive facility controlling software for supporting an input operation for the first type of working and the second type of working;

wherein first data for the first type of working and second data for the second type of working are separately inputted and displayable on a single window under a control of the interactive facility controlling software.

6. The numerical control device according to claim 5, wherein the interactive facility controlling software and at least one of the first software and the second software are stored in a single memory area.

7. The numerical control device according to claim 5, wherein the single window is viewable on a display attached to an operator control panel and the interactive facility controlling software creates a working program for the compound machine tool based on the first data and the second data inputted through the operator control panel.

8. A numerical control device for a compound machine tool, comprising:

a CPU;

a memory;

a display;

an operator control panel having a keyboard;

an input/output interface; and interactive facility controlling software for supporting an input operation for a first type of working of a material and a second type of working of the material, wherein first data for the first type of working and second data for the second type of working are inputted and displayable on a single window viewed on the display under a control of the interactive facility controlling software.

9. The numerical control device according to claim 8, wherein a menu is displayable on the display so that the first data and the second data are inputted on the operator control panel in response to a displayable menu by employing the keyboard on the operator control panel.

* * * * *

UNITED STATES PATENT AND TRADEMARK OFFICE
CERTIFICATE OF CORRECTION

PATENT NO. : 6,915,181 B1
DATED : July 5, 2005
INVENTOR(S) : Satoru Shinozaki et al.

Figure 11:
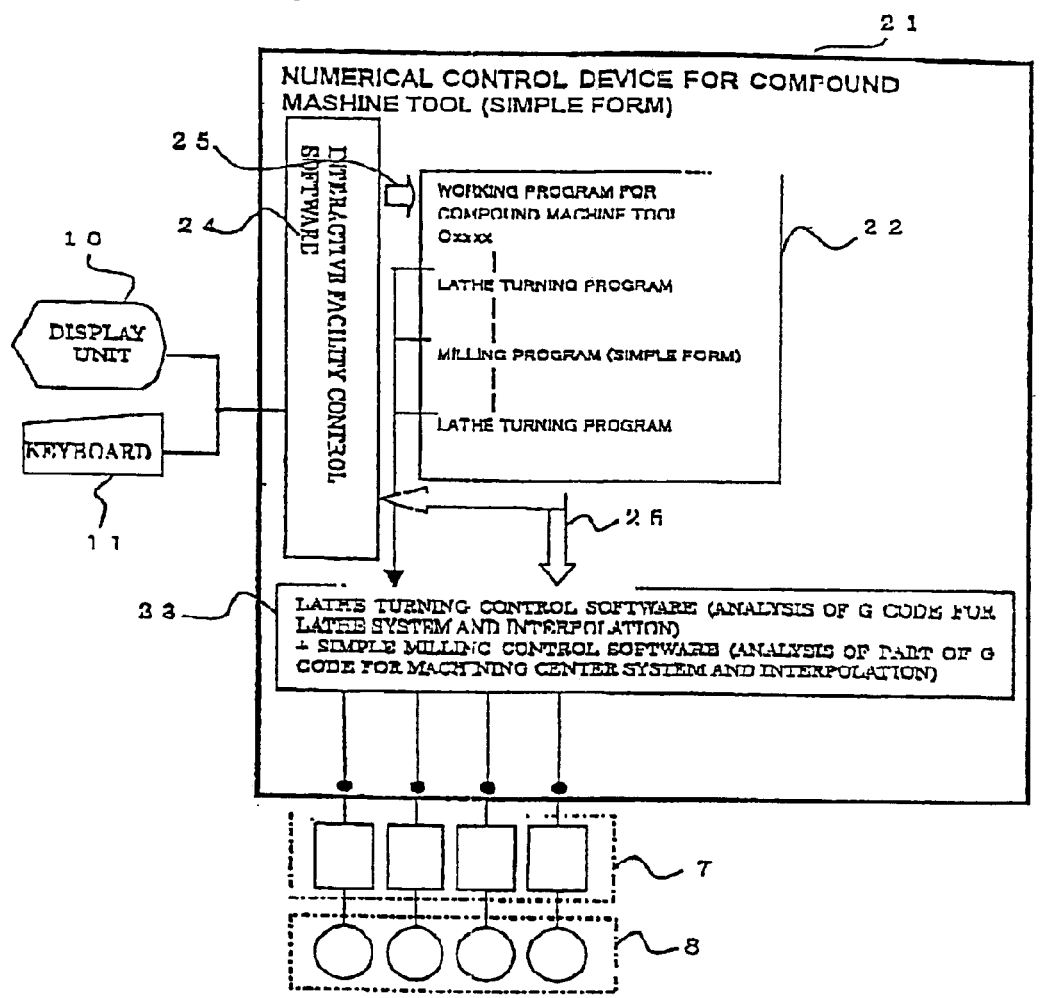
FIG. 11 is a schematic diagram of a conventional simple type numerical control device for a compound machine tool using a numerical control device for lathe.

It is certified that error appears in the above-identified patent and that said Letters Patent is hereby corrected as shown below:

Drawings,
Fig. 1, reference numeral 10, replace "UNUT" with -- UNIT --.
Fig. 1, reference numeral 5, replace "GYSTEM" with -- SYSTEM --.
Fig. 5, line 1, replace "OORDINATE" with -- COORIDNATE --.
Fig. 6, reference numeral 5, line 2, after "of" replace "O" with -- G --.
Fig. 11, reference numeral 21, line 2, replace "MASHINE" with -- MACHINE --.
Fig. 11, reference numeral 23, line 3, replace "MILLINC" with -- MILLING --.

Column 1,
Line 34, after "complex" insert -- . --.

Column 2,
Line 15, replace "from-" with -- from --.

Column 6,
Line 49, after "is" delete "d".
Line 54, replace "the-flow" with -- the flow --.

Signed and Sealed this

Twenty-eighth Day of March, 2006

JON W. DUDAS
*Director of the United States Patent and Trademark Office*